(12) United States Patent
Bertsch et al.

(10) Patent No.: US 11,052,358 B2
(45) Date of Patent: Jul. 6, 2021

(54) BEVERAGE POD

(71) Applicant: VEJO IP AG, Bielbenken BL (CH)

(72) Inventors: Christoph Bertsch, Pacific Palisades, CA (US); Werner Balkau, Schwandi (CH)

(73) Assignee: VEJO IP AG, BielBenken BL (CH)

( * ) Notice: Subject to any disclaimer, the term of this patent is extended or adjusted under 35 U.S.C. 154(b) by 0 days.

(21) Appl. No.: 16/779,323

(22) Filed: Jan. 31, 2020

(65) Prior Publication Data

US 2020/0188867 A1 Jun. 18, 2020

Related U.S. Application Data

(60) Continuation-in-part of application No. 16/576,600, filed on Sep. 19, 2019, which is a continuation of
(Continued)

(51) Int. Cl.
| | |
|---|---|
| *B65D 51/18* | (2006.01) |
| *B65D 83/00* | (2006.01) |
| *B65D 47/04* | (2006.01) |
| *B65D 77/20* | (2006.01) |
| *B01F 15/00* | (2006.01) |

(Continued)

(52) U.S. Cl.
CPC ........... *B01F 13/002* (2013.01); *A47J 43/042* (2013.01); *B01F 7/162* (2013.01); *B01F 13/0022* (2013.01); *B01F 15/0087* (2013.01); *B01F 15/00519* (2013.01); *B65D 47/046* (2013.01); *B65D 51/185* (2013.01); *B65D 77/2024* (2013.01); *B65D 81/3222* (2013.01);
(Continued)

(58) Field of Classification Search
CPC .................................................. A47J 31/0668
USPC ......................................................... 206/219
See application file for complete search history.

(56) References Cited

U.S. PATENT DOCUMENTS

| | | | |
|---|---|---|---|
| 4,362,033 A | 12/1982 | Young | |
| 4,487,509 A | 12/1984 | Boyce | |

(Continued)

FOREIGN PATENT DOCUMENTS

| | | |
|---|---|---|
| DE | 10 2016 005983 | 11/2017 |
| EP | 2 311 748 A1 | 4/2011 |

(Continued)

OTHER PUBLICATIONS

European Patent Office, International Search Report for PCT Application No. PCT PCT/IB2019/056985, dated Dec. 12, 2019. 5 pages.
(Continued)

*Primary Examiner* — Anthony D Stashick
*Assistant Examiner* — L Kmet
(74) *Attorney, Agent, or Firm* — SoCal IP Law Group LLP; Guy Cumberbatch

(57) ABSTRACT

A container includes a receptacle to hold nutrients and other food contents for a smoothie. The container is used with a larger vessel such as a blender into which the capsule is inserted and into which water or other fluid is poured. When the blender is closed, the container opens to release its contents for blending with the fluid into a delicious, healthful smoothie. The container may have a cover with opening flaps and relatively movable elements that pivot the flaps open when opposite forces are applied to the container by the larger vessel.

20 Claims, 10 Drawing Sheets

Related U.S. Application Data application No. 16/216,343, filed on Dec. 11, 2018, now Pat. No. 10,427,119, which is a division of application No. 16/107,787, filed on Aug. 21, 2018, now Pat. No. 10,399,050.

(51) Int. Cl.

| | | |
|---|---|---|
| *B01F 13/00* | (2006.01) | |
| *B65D 81/32* | (2006.01) | |
| *B01F 7/16* | (2006.01) | |
| *A47J 43/042* | (2006.01) | |

(52) U.S. Cl.
CPC .. *B65D 83/0094* (2013.01); *B65D 2251/0031* (2013.01); *B65D 2251/0087* (2013.01)

(56) References Cited

U.S. PATENT DOCUMENTS

| | | | |
|---|---|---|---|
| 5,170,888 | A | 12/1992 | Goncalves |
| 5,425,579 | A | 6/1995 | Sampson |
| 5,797,313 | A | 8/1998 | Rothley |
| 6,132,078 | A | 10/2000 | Lin |
| 6,962,432 | B2 | 11/2005 | Hofeldt |
| 7,364,348 | B1 | 4/2008 | Jones |
| 7,371,004 | B1 | 5/2008 | Branson, III |
| 8,403,131 | B2 | 3/2013 | Rovelli |
| 8,684,231 | B2 | 4/2014 | Lane et al. |
| 8,887,905 | B2 | 11/2014 | Muhlemann |
| 9,132,950 | B1 | 9/2015 | Anderson et al. |
| 9,504,974 | B2 | 11/2016 | Ochoa et al. |
| 9,717,264 | B2 | 8/2017 | Herbert |
| 9,775,454 | B2 | 10/2017 | Gonzalez |
| 9,883,766 | B2 | 2/2018 | Nachawati |
| 9,932,217 | B2 | 4/2018 | Perrelli et al. |
| 10,023,370 | B2 | 7/2018 | Muhlemann |
| 10,315,830 | B2 | 6/2019 | Muhlemann |
| D852,589 | S | 7/2019 | Bertsch |
| 10,532,866 | B2 | 1/2020 | Teague |
| 2005/0167296 | A1 | 8/2005 | Shenkar |
| 2006/0198241 | A1 | 9/2006 | Krishnachaitanya et al. |
| 2008/0290061 | A1* | 11/2008 | Seelhofer ........... B65D 51/2835 215/249 |
| 2010/0025268 | A1 | 2/2010 | Lee et al. |
| 2010/0055252 | A1* | 3/2010 | Marina .............. B65D 51/2821 426/77 |
| 2010/0185322 | A1 | 7/2010 | Bylsma et al. |
| 2014/0120217 | A1* | 5/2014 | O'Brien ............. B65D 85/8043 426/115 |
| 2015/0374175 | A1 | 12/2015 | Garr |
| 2016/0159632 | A1 | 6/2016 | Wheatley et al. |
| 2017/0101252 | A1 | 4/2017 | Acott |
| 2017/0129665 | A1 | 5/2017 | Rolfes |
| 2017/0156540 | A1 | 6/2017 | Wheatley et al. |
| 2017/0280745 | A1 | 10/2017 | Herbert et al. |
| 2018/0290823 | A1 | 10/2018 | Muhlemann |
| 2019/0047771 | A1 | 2/2019 | Muhlemann |
| 2019/0062034 | A1 | 2/2019 | Muhlemann |
| 2019/0256279 | A1 | 8/2019 | Muhlemann |

FOREIGN PATENT DOCUMENTS

| | | |
|---|---|---|
| WO | 2015/148183 A1 | 10/2015 |
| WO | 2018/172781 A1 | 9/2018 |

OTHER PUBLICATIONS

European Patent Office, Written Opinion for PCT Application No. PCT PCT/IB2019/056985, dated Dec. 12, 2019. 5 pages.

"NutriBullet 600 Nutrient Extractor & Hi-Speed Blender." NutriLiving by NutriBullet. Dec. 3, 2018. Accessed Dec. 6, 2018. https://www.nutriliving.com/shop/nutribullet.

"Single-Serve Blender with Travel Lid." Infographic: Fast Facts on Coffee Consumption—HamiltonBeach.com. Accessed Dec. 6, 2018. https://www.hamiltonbeach.com/single-serve-blender-with-travel-lid-51101b.

"Portable Blender USB Juicer Cup" Amazon. Accessed Dec. 6, 2018. https://www.amazon.com/Portable-Blender-USB-Juicer-Cup/dp/B0718XXVBR.

"KUWAN Mini Electric Fruit Juicer Rechargeable Portable Blender with USB Charging Cable." Amazon. Accessed Dec. 6, 2018. https://www.amazon.com/KUWAN-Electric-Rechargeable-portable-protection/dp/B071ZVQSP5.

"Buy Predator Nutrition Mixer Bottle | Blender/Shaker in One." Predator Nutrition. Oct. 15, 2018. Accessed Dec. 6, 2018. https://www.predatornutrition.com/shakers-bottles-mixers/predator-nutrition/mako-vortex-mixer.html.

"PODlife—Quality Protein Powders in Biodegradable PODs." Kickstarter. Accessed Dec. 6, 2018. https://www.kickstarter.com/projects/podlife/podlife-protein-in-pods.

"LifeFuels—Personalized Drinks, on the Go." LifeFuels—Personalized Drinks, on the Go. Accessed Dec. 6, 2018. https://www.lifefuels.co/.

Drinkfinity. "A New Drink for Every You, by Mixing Water with Simply Great Ingredients." Drinkfinity. Accessed Dec. 6, 2018. https://www.drinkfinity.com/.

* cited by examiner

BEVERAGE POD

CROSS-REFERENCE TO RELATED APPLICATION

This patent is a continuation-in-part of U.S. patent application Ser. No. 16/576,600, filed Sep. 19, 2019, entitled "Pods for Blender System," which is a continuation of U.S. patent application Ser. No. 16/216,343, filed Dec. 11, 2018, entitled "Beverage Blender System", now U.S. Pat. No. 10,427,119, which is a divisional application of U.S. patent application Ser. No. 16/107,787, filed Aug. 21, 2018, now U.S. Pat. No. 10,399,050, entitled "Beverage Blender System," the contents of which are expressly incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to containers for smoothie ingredients.

Description of the Related Art

Different types of available stationary and portable blenders allow consumers to blend whole fruits, vegetables, nuts, seeds, milks and other ingredients to create nutrition smoothies. However, the process of buying and preparing these ingredients can be inconvenient and costly. Existing portable blenders still require bulky and messy ingredients to be purchased, carried, and prepared to blend a smoothie. A portable blender that can be used to conveniently make nutrition smoothies and other foods is desirable.

Figure 1:
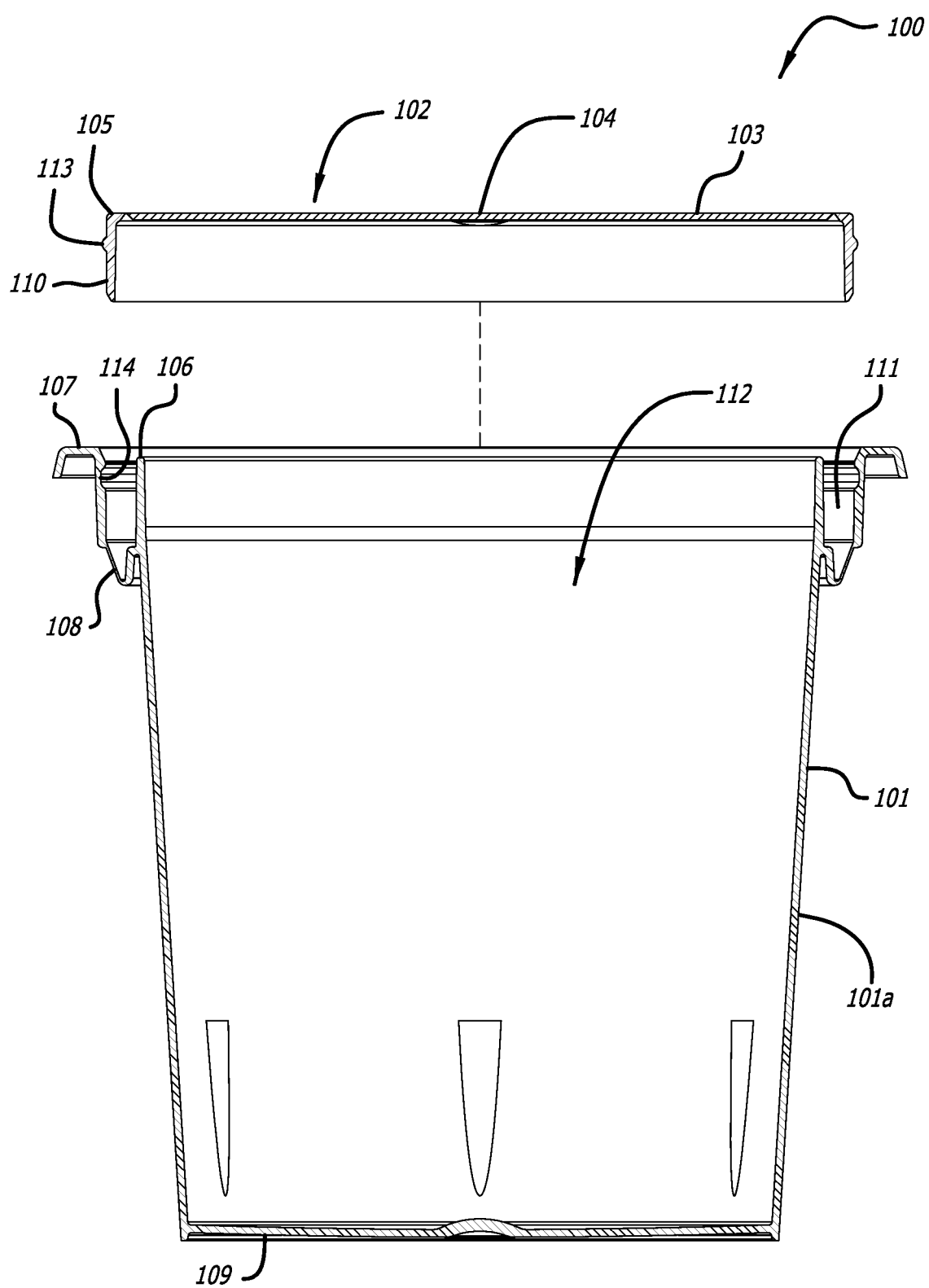
FIG. 1 is an exploded cross-sectional side view of a container in an upright closed position.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously described element having a reference designator with the same least significant digits.

DETAILED DESCRIPTION

A container (e.g., pod) for a portable blender that easily and conveniently make a delightful, smoothly blended beverage or food (hereinafter referred to as a "smoothie") is disclosed herein. The container contains a pourable drink mix concentrate and is convenient for a consumer to transport along with the blender. The term "blender" means a vessel for holding a liquid, namely a liquid food product, that is larger than the container. As will be seen, the contents of the container are deposited within the vessel along with supplementary liquids and mixed to form a combination. The blender may incorporate a mixing device such as blender blades to be driven by a motor, but the containers described herein may also be used in so-called shakers which do not have mixing blades. Accordingly, the term "blender" means a vessel for holding a liquid with or without mixing blades.

The drink mix concentrate may be or include one or more edible nutrients such as fruits and vegetables, protein, vitamins, minerals and supplements. One potential usage is for soups, with a bouillon cube-type pod, where hot water or other liquid is required. The drink mix concentrate may be or include one or more non-food items, such as acidity regulators, anticaking agents, antifoaming agents, antioxidants, bleaching agents, bulking agents, carbonating agents, carriers, colors and color agents, color retention agents, emulsifiers, emulsifying salts, firming agents, flavor enhancers, flour treatment agents, foaming agents, gelling agents, glazing agents, humectants, packaging gasses, preservatives, propellants, raising agents, sequestrants, stabilizers, sweeteners, and thickeners. The drink mix concentrate may be whole, chopped or powdered, wet, moist or dry, active or inert. The drink mix concentrate may be in powder form, tablets, caplets, etc., or combinations thereof. For example, the concentrate may have a gel-cap style vitamin tossed in with powdered nutrients such that the gel-cap maintains its integrity without degrading until exposed to liquid inside the blender.

In use, the container is placed into a receptable in a blender. The blender opens the container so that the drink mix concentrate is discharged into a chamber of the blender. The drink mix concentrate is then blended with a second pourable, edible substance in the form of a fluid, suspension or mixture, such as water, juice, milk, soymilk, or almond milk. The second pourable substance dilutes the drink mix concentrate, and blended together they form a rich, nutrient-dense smoothie. A blending assembly in the blender properly blends the drink mix concentrate and the second pourable substance to eliminate clumps and achieve desired viscosity and aeration, providing a wonderful product. By pourable it is meant that the drink mix concentrate will flow in a stream under force of gravity.

Referring now to FIG. 1, an exploded cross-sectional side view of a container 100 in an upright closed position is shown. When inserted into a blender such as that shown in FIG. 10, the container is flipped over and inserted upside down as shown. With an adequate opening in the container, the drink mix concentrate pours out of the container 100. The container 100 is generally conical oriented about a central axis which defines up and down.

Figure 2:
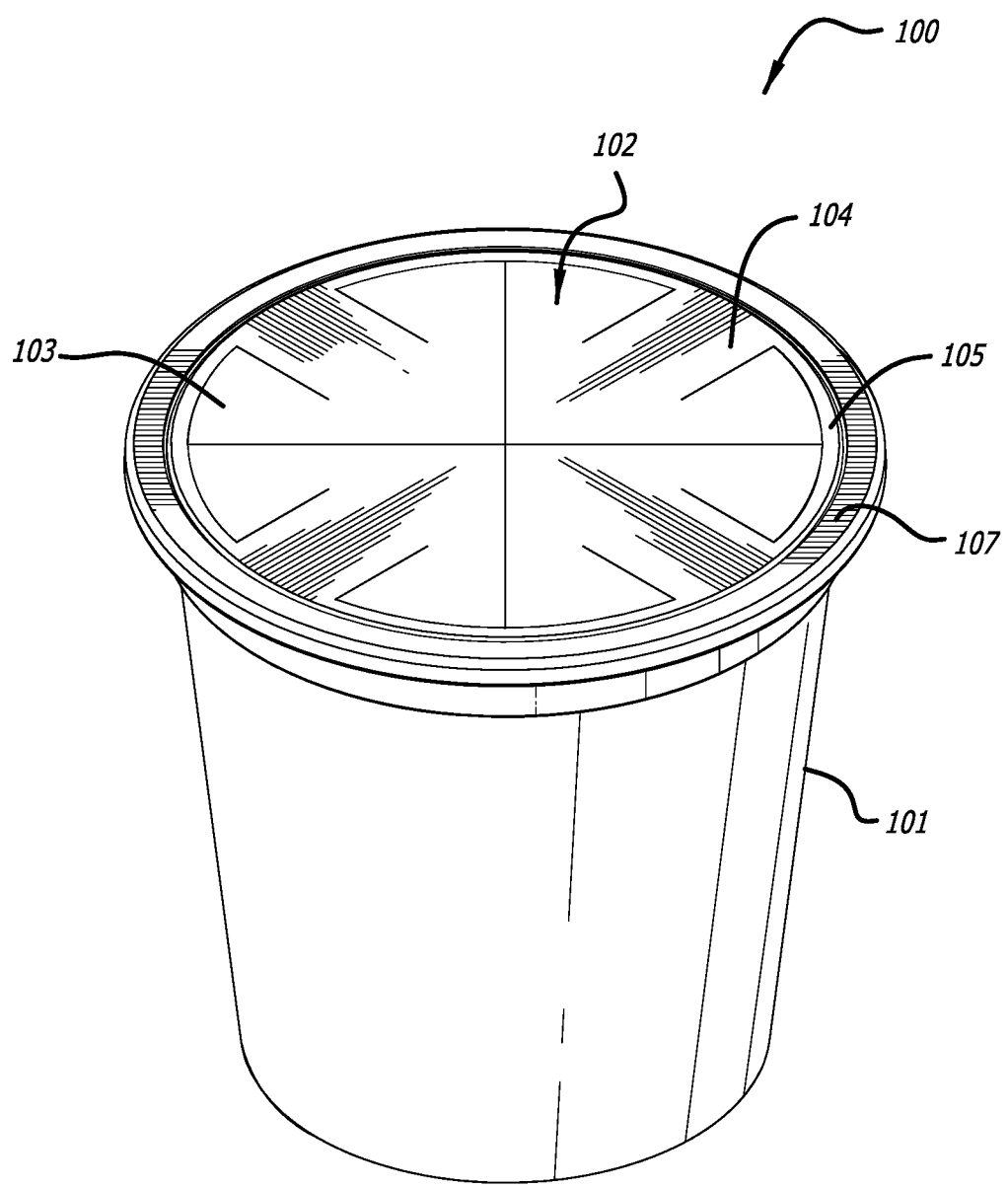
FIG. 2 is a perspective view of the container in an upright closed position having a cover with four flaps.
Figure 3:
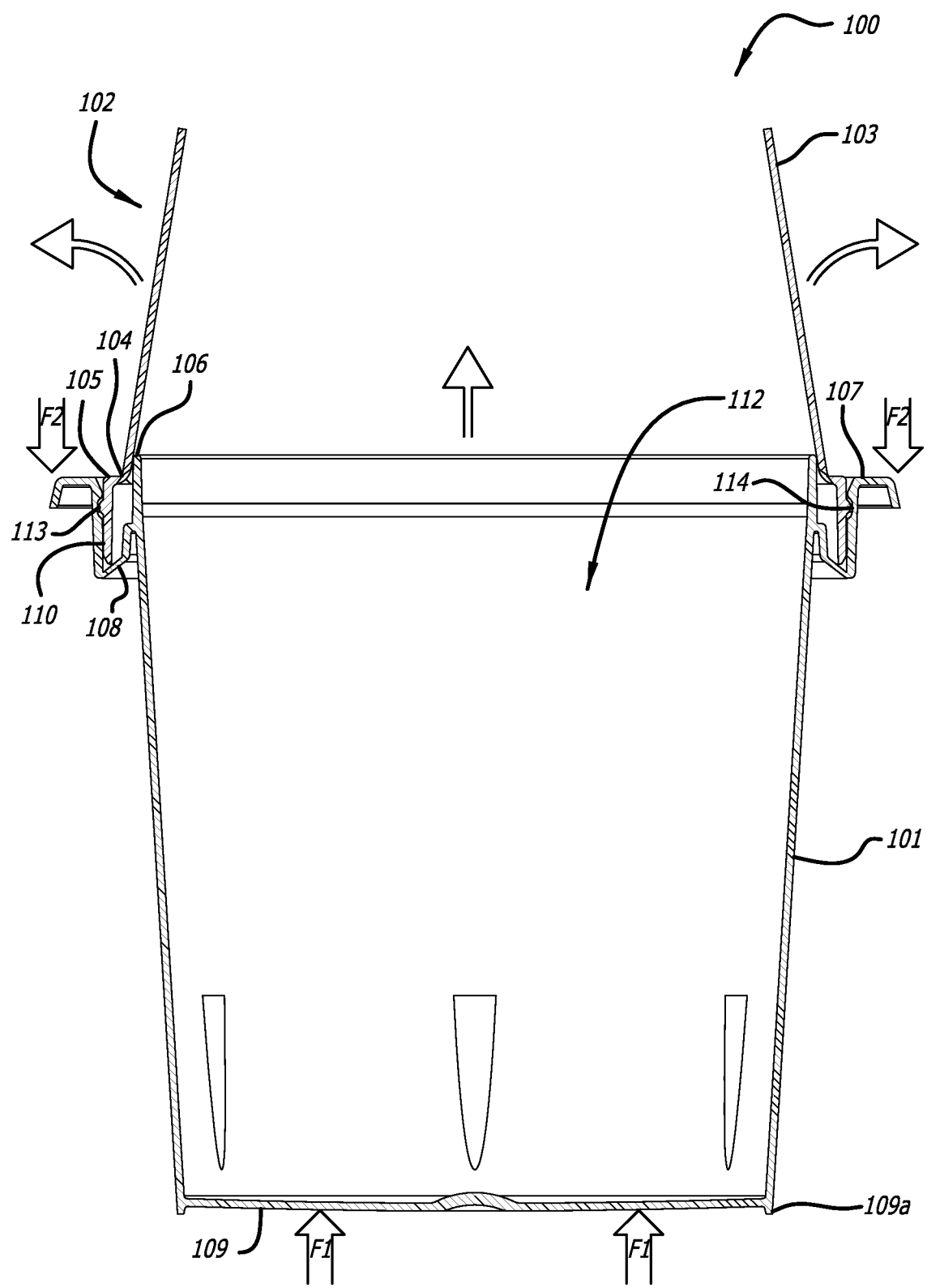
FIG. 3 is a cross-sectional view of the container in an upright open position.
Figure 4:
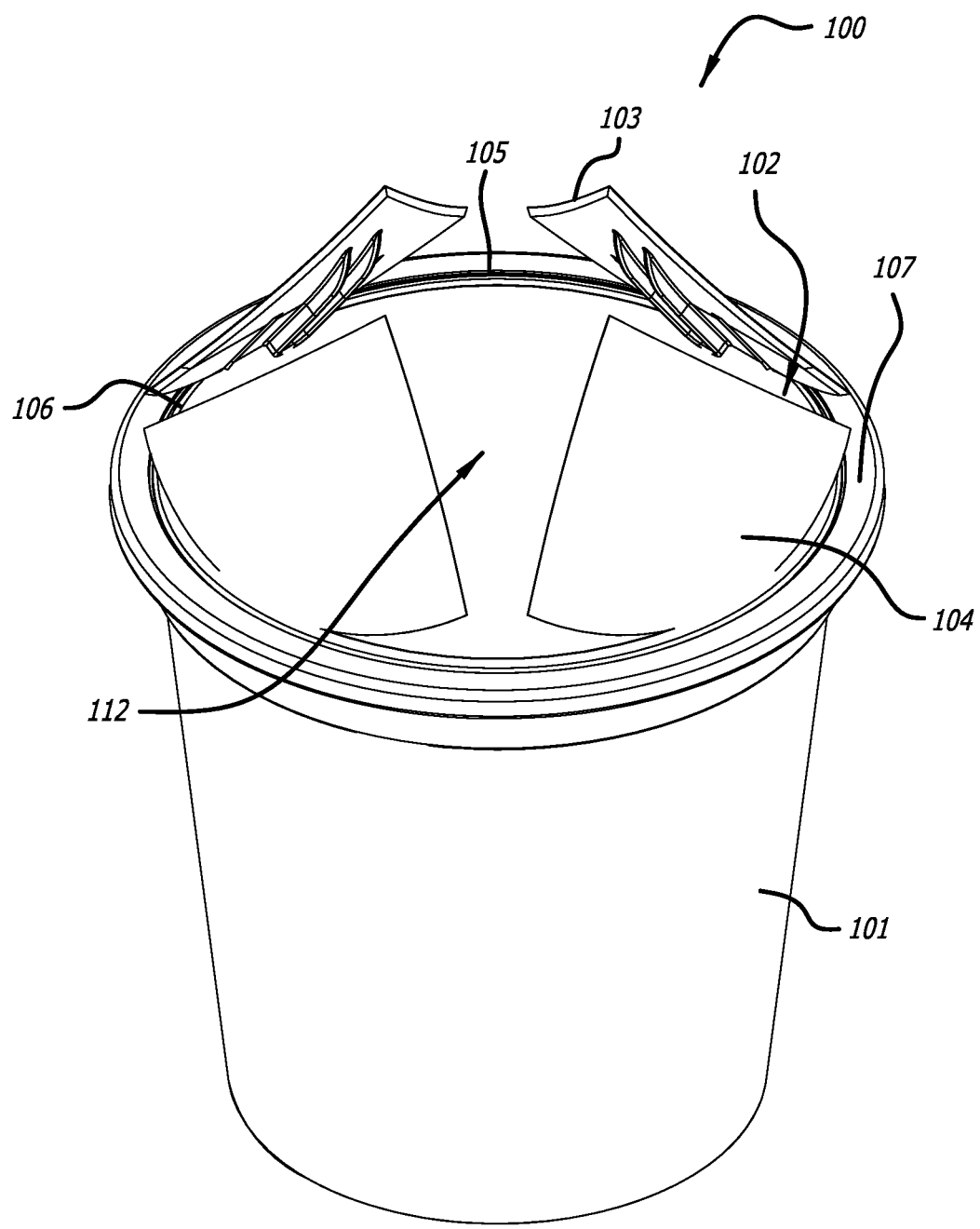
FIG. 4 is a perspective view of the container in an upright open position.

FIG. 2 is a perspective view of the container 100 in an upright closed position, FIG. 3 is a cross-sectional view of the container 100 in an upright open position, and FIG. 4 is a perspective view of the container 100 in an upright open position. The container 100 has a cup-like receptacle 101 that can receive and hold a portion of drink mix concentrate in an interior space 112, and a cover 102 to keep the drink mix concentrate in the receptacle 101. The cover 102 provides an upper outer surface of the container 100.

The container 100 may be configured to have a size with a capacity for a portion of drink mix concentrate that is complementary to the fluid capacity of the blender, such that a smoothie with a desirable consistency and flavor can be blended. For example, the container 100 can have a capacity from one fluid ounce to eight fluid ounces. In one example where the blender has a capacity of ten fluid ounces, the container 100 may have a capacity of 2 fluid ounces.

The container 100 may be single serving in that is has a volume appropriate for a single serving of the blended drink mix concentrate as designed to be combined with the second pourable substance. That is, the container 100 has proper amount of drink mix concentrate to make one smoothie.

The container 100 may be single use in that, by the nature of how it is intended to be used, the container is poorly suited to be reused for the same purpose. For example, the action of opening the container 100 may render it generally unsuited for reuse.

The container 100 may be sized to just hold the portion of drink mix concentrate. The container 100 size may be generic to a variety of drink mix concentrates. The container 100 may be sized to accommodate a least concentrated drink mix concentrate with the least amount of acceptable empty space, and a most concentrated drink mix concentrate with the most amount of acceptable empty space. The acceptable amount of empty space may be between 5% and 75% of the volume of the receptacle. Tighter tolerance may be appropriate, such as 45-65%.

The receptacle 101 has side walls 101a and a closed end 109 providing a lower outer surface with a lower rim 109a at its perimeter. The lower outer surface may be flat, or, as shown in FIG. 3, the lower rim 109a may be essentially an extension of the receptacle's side walls 101a. The interior space 112 is defined by the closed end 109 and a gape, or wide open mouth, which is covered by the cover 102. The receptacle 101 can have a truncated conical shape (as shown). Other suitable shapes include cylindrical, cubical and prismatic. The receptable 101 may have ribs for structural support.

An inner lip 106 is at a perimeter of the gape. An outer rim 107 is positioned outside and spaced apart from the inner lip 106. The apron 107 is coupled to the receptacle 101 via a circular lip diaphragm or hinge 108 located below the inner lip 106, such that a slot 111 is formed between the outer rim 107 and the inner lip 106. The outer rim 107 may further include a radial ledge or widening extending away from the gape. The closed end 109 may be sized across at least 25 mm and less than 45 mm. The lower rim 109a may be circular as shown or other regular or irregular shapes. Thus, this sizing may be with reference to the widest and narrowest distances across the lower rim 109a.

The outer rim 107 is a portion of the outer surface and serves as a platform when the container 100 is turned upside down. The outer rim 107 may be a liplike member extending away from the receptacle 101.

The cover 102 includes an apron 110 and flaps 103. An apron rim 105 is at an edge of the apron 110 opposite the closed end 109. The apron 110 may be configured to fit in the slot 111, e.g., via a snap-fit, press-fit, or friction-fit. The apron 110 may include a ridge 113 that is configured to complement a groove 114 on the outer rim 107 in the slot 111 to further fix the cover 102 to the outer rim 107. Alternatively, the apron 110 may include a groove that is configured to complement a ridge on the outer rim 107 in the slot.

The cover 102 has a sizing across its external surface. This sizing, if the cover 102 is circular as shown, is a diameter, but the cover 102 can have other regular or irregular shapes. The cover 102 may be sized across at least 25 mm and less than 65 mm.

The flaps 103 are broad flat projections that are coupled to the apron rim 105 via a flap hinge 104, where the flap hinge 104 only extends along a portion of the flap 103. The flaps 103 are positioned to cover the gape, where each flap covers a portion of the gape. Four flaps 103 are shown, but other suitable numbers of flaps that are shaped and positioned to cover the gape can be used, such as one, two, three, five or six. If the cover 102 has a single flap, the flap may cover the entirety of the gape.

To prepare the container 100 for consumer use, a portion of drink mix concentrate is deposited into the receptacle 101. The cover 102 and receptacle 101 are then attached to one another. For example, the cover 102 may be positioned on the receptacle 101 so that the apron 110 slides into the slot 111 until the apron rim 105 is substantially flush with the outer rim 107 when the cover 102 is fixed to the receptacle 101, as shown in FIG. 2. In this closed position, the flaps 103 cover the gape and the drink mix concentrate is held in the closed container 100.

Figure 10:
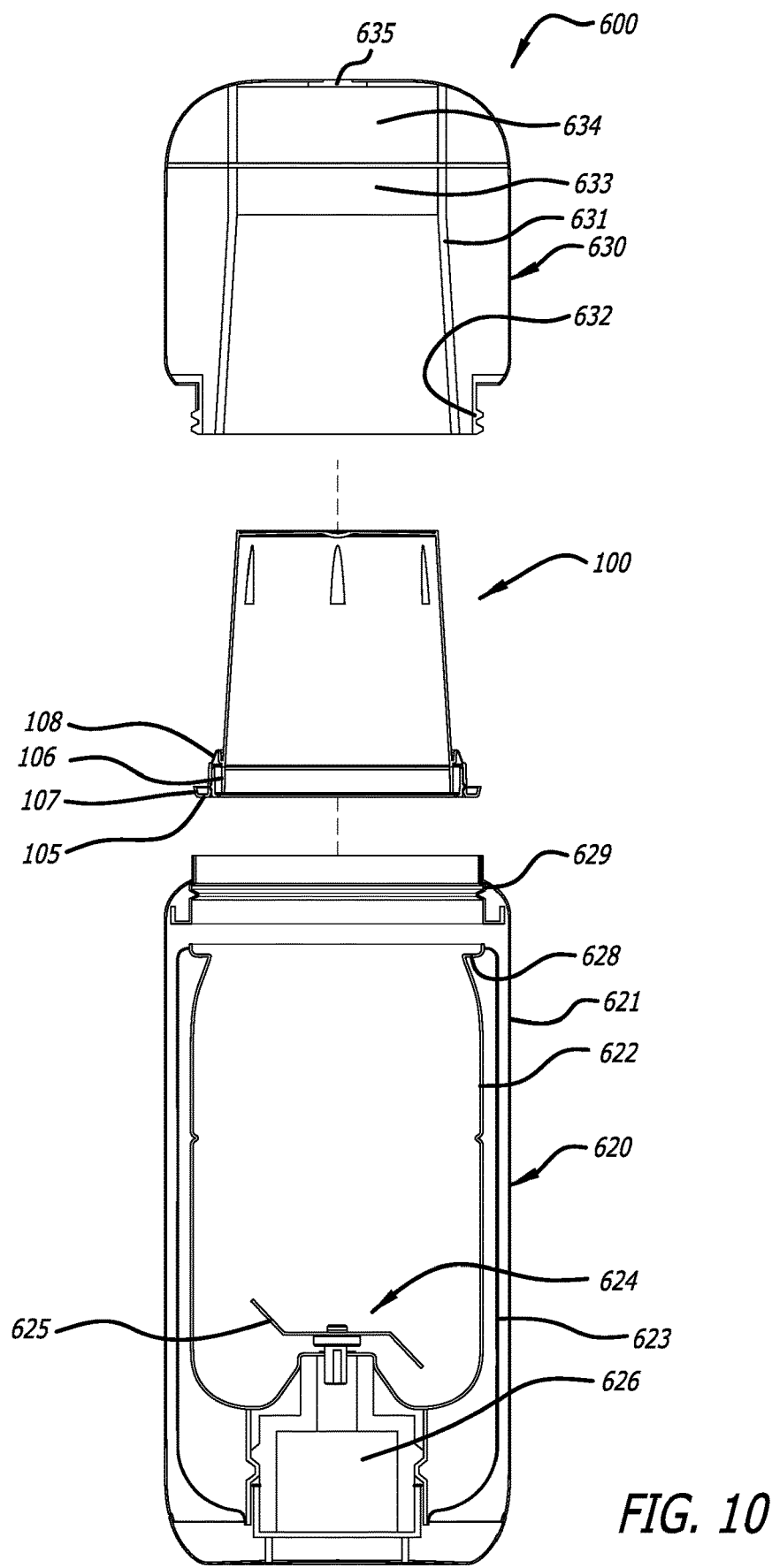
FIG. 10 is an exploded cross-sectional view of a blender and the container.

When inserted into a blender such as that shown in FIG. 10, the container 100 is flipped over and inserted upside down as shown. The drink mix concentrate can then be released from the closed container 100 for use and consumption. The container 100 restricts the portion of the drink mix concentrate to the interior space 112 until released. Release may occur from application of one or more forces to the container 100. Application of these forces causes an opening to form in the cover 102. The opening forces may each fall within a range to allow for variations in containers, wear and tear, etc. The opening force may be applied to the container 100 in a number of ways.

For example, opening forces F1, F2 may be applied in opposite directions only to the outer rim 107 and the lower rim 109a, as shown in FIG. 3, such as when acted on by components of the larger drink vessel or blender. The inner lip 106 pushes the flaps 103 open and away from the receptacle 101 when the outer rim 107 and the apron rim 105 are pressed towards the closed end 109. The circular lip diaphragm or hinge 108 allows the outer rim 107 to move or "collapse" with respect to inner lip 106. For the purpose of this discussion, it will be understood that the container 100 is shown upright, although in the process of emptying the container it is inverted upside-down so that the contents fall through the open cover 102 by gravity. Consequently, the opening force F1 is actually applied in a downward direction and the force F2 is applied in an upward direction.

In use, the closed container 100 is inverted to an upside-down orientation and placed in the vessel, such as the blender 600 described below with respect to FIG. 10. The closed end 109 is thus pointed upward, or out of the larger vessel. The outer rim 107 and the apron rim 105 are sized to be supported by an inner annular shoulder within the vessel, as will be described. Subsequently, by applying a downward force F1 on the closed end 109, the opposite opening forces F1, F2 are generated. As will be explained below, the downward force in the closed end 109 may be applied by simply screwing on the lid of the blender, or through other means.

The downward force F1 (countered by the upward force F2) pushes the outer rim 107 and apron rim 105 towards the closed end 109. As the apron rim 105 moves towards the closed end 109, the inner lip 106 presses downward the against the flaps 103, which then rotate on their respective flap hinges 104 open and away from the receptacle 101. With the flaps 103 open, the drink mix concentrate can be discharged from the container 100 through the gap. The container 100 should reliably discharge the drink mix concentrate without the drink mix concentrate clinging, sticking or exploding. The container 100 should be adapted to prevent the second pourable material, when poured into or disposed in the blender, from splashing up into the container 100. When the opening forces are applied to the container 100, besides opening the flaps 103 other portions of the container may alter form. For example, the side walls of the receptacle 101 may deform, with some portions squeezing in and others bulging out. Pressure against the side walls, for example from the blender, may further direct the opening forces toward creating the opening in the cover 102.

Based upon the dimensions of the container 100 provided herein, a combined simultaneous opening force of between 25 N and 75 N is sufficient to create an opening in the cover which allows the drink mix concentrate to pour out of an inverted container. An opening force may be 63.2 N±3 N, which has been found to work well with a circular upper rim 107 diameter of about 55 mm and a circular lower rim 109a diameter of about 38 mm. These specifications also depend on the makeup of the container 100, both the materials and the dimensions. The forces may be applied evenly.

The flaps 103 may be disposed in an iris pattern and have an iris-like mechanism. That is, rotational forces around the apron rim 105 cause the flaps 103 to pull apart and out, creating an opening in the cover 102.

The interior space 112 of the container 100 may be at a controlled air pressure. As such, the drink mix concentrate may be under pressure or a vacuum. This may help to preserve the drink mix concentrate. Pressure may aid in opening of the container 100. The sealed container 100 may include a gas, such as nitrogen (because it is inert) or air, and the container walls may be sufficiently pliable to be squeezed. When the container 100 is squeezed, the flaps 103 may burp open to release the contents.

For example, after the container 100 is inserted into the blender's lid and the lid closed, a twist of the lid may squeeze the container 100 and cause the flaps 103 to pop open. The blender may inject a gas or fluid into the container to increase internal pressure to entirely or partially force the cover to open. The flaps 103 may be more rigid than the rest of the container, and the flaps' seal of the gape 112 is weak such that squeezing the container 100 results in the flaps 103 opening.

The flaps 103 can overlap or be coupled to each other with a membrane. The container 100 can be constructed of only one piece or of multiple pieces. The container 100 can include an inner knife mechanism, where pressure on the closed end 109 of the receptacle 101 causes the inner knife mechanism to push the flaps 103 out or puncture a seal to allow the drink mix concentrate to be discharged from the container 100. The closed end 109 can be deformable from one configuration (e.g., convex) to another configuration (e.g., concave) to further aid in the discharging of the drink mix concentrate.

Multiple containers may be packaged together. For example, multiple containers may be joined in a string or array, with the joints weaker than the containers such user may pull apart the joint without causing material damage to the containers. Multiple containers may be packaged in a blister pack.

The mechanical properties of the container 100 are sufficient to maintain physical integrity and sustain loads without breaking or forming defects in a consumer environment. The container 100 may be made from nonporous and humidity impervious materials to protect the drink mix concentrate sealed within.

The container may be formed of one or more of plastic, metal, compostable materials, cardboard, waxed paperboard and bioplastic. The container is sufficiently rigid so as to prevent deformation of the receptacle 101 and the cover 102 during storage and transportation, especially so that the drink mix concentrate remains in the receptable 101 and is not contaminated. The materials of the container 100 should have a taste which is tasteless, readily masked or desirable. Odor, likewise, should be absent, readily masked or desirable. The container may be made partially or entirely of edible and/or compostable and/or biodegradable components.

The container may be formed in whole or in part of a membrane which can be naturally derived or manufactured, and which is safe for humans to consume, such as alginate or non-animal stable hyaluronic acid (NASHA). The membrane may be biodegradable. The membrane may act as a water insoluble packaging material which, upon sealing, in whole or in part surrounds the product and securely stores or holds it. One or both of the receptacle 101 and the cover 102 may be formed of a membrane, and the membrane may have varied thickness and other physical properties in different portions. For example, one or more sections of the membrane may be flaps which are initially contiguous with the sealed membrane but which can be pulled away to release the contents.

A membrane-based container may take various form factors. The container may have a hemispheric or be a hemispheroid, with a flat side and a curved side, and adapted to be opened from either the flat side of the curved side. The container may be pillow-like or shaped like a fat pillow. The container may be keyed such that it will easily fit into a receptacle of the blender in only one way, to ensure that the container is disposed in the blender as intended for optimal performance.

Once disposed into the blender, the membrane of the capsule may release the drink mix concentrate. To achieve opening, the blender may cut open the membrane to release the drink mix concentrate. The blender may have a knife or laser which cuts open the membrane. The blender may have a heater which melts the membrane in whole or in part to open a pathway for the drink mix concentrate to exit. The blender's container-receptacle may have smaller volume than that of the container, such that closing the blender causes the membrane to burst open. The membrane of the container may have a weaker portion designed to open first, such that during normal use when the blender closes around the membrane, the weaker portion opens and releases the contents. All or part of the membrane may dissolve in the blender, such as from exposure to water and/or another chemical. For example, if the blender cuts open the membrane, cut off portions of the membrane may become part of the smoothie.

The membrane may be formed of two or more parts which are joined together, e.g., sealed, or may be a single part. The parts may be formed from a gel which is crosslinked, dried or cured to reach the desired characteristics. A membrane may have two or more layers, each with different properties. This may improve mechanical resistance and hygiene properties of the capsule. For example, the outer layer may be removable, e.g., by peeling, such that in use the user removes the outer layer before putting the capsule into the blender. In such a case the outer layer does not need to be edible.

The membrane may be formed from a solution of alginate 1-10 wt % and/or NASHA, with a thickener such as xanthan or cellulose gum. The thickener may be or include native starch, modified starch, cellulose gel, guar gum, tara gum, carrageenan, gum tragacanth, locust bean gum, microcrystalline cellulose, pectin, gellan gum, glucumannan and succinoglycan. The mixture may be blended with a plasticizing additive in order to increase plasticity prior to extrusion. Such additives may include glycerol or sodium stearate, agar, carrageenan or pectin.

Stabilizers or other compounds for increasing plasticity of the membrane may be used. These may include one or more selection from 1,3-butylene glycol, acacia, acetic and fatty acid esters of glycerol, acetone, acetylated distarch adipate, acetylated monoglycerides, acid-treated starch, agar, alginic acid, alkaline-treated starch, anoxomer, ascorbic acid, ascorbyl palmitate, ascorbyl stearate, azodicarbonamide, beeswax, bleached starch, bone phosphate, brominated vegetable oil, calcium acetate, calcium alginate, calcium aluminum silicate, calcium ascorbate, calcium benzoate, calcium bromate, calcium carbonates, calcium chloride, calcium citrate, calcium dihydrogen phosphate, calcium disodium ethylenediamine-tetraacetate, calcium DL-malate, calcium ferrocyanide, calcium gluconate, calcium hydrogen sulfite, calcium hydroxide, calcium iodate, calcium lactate, calcium lactate gluconate, calcium lactobionate, calcium peroxide, calcium phosphate, calcium polyphosphates, calcium propionate, calcium pyrophosphate, calcium salts of fatty acids, calcium silicate, calcium sorbate, calcium stearate, calcium stearoyl lactylate, calcium sulfate, calcium tartrate, calcium iodate, candelilla wax, carbamide, carbon dioxide, carnauba wax, carob bean gum, carrageenan, castor oil, cellulose gum, celluloses, choline salts and esters, citric acid, citric and fatty acid esters of glycerol, crosslinked sodium carboxymethylcellulose, cupric sulfate, D-alpha-tocopherol, dam mar gum, decanoic acid, deoxycholic acid, dextrins, dextrin ethyl cellulose, dextrose, diacetyltartaric acid esters of mono- and diglycerides of fatty acids, diammonium hydrogen phosphate, dicalcium pyrophosphate, diethyl pyrocarbonate, ethyl alcohol, ethyl cellulose, ethyl hydroxyethyl cellulose, ethyl p-hydroxybenzoate, ethyl protocatechuate, ethylene dichloride, esters of glycerol and thermally oxidized soy bean fatty acids, ethoxylated mono- and diglycerides, ethyl hydroxyethyl cellulose, formic acid, gellan gum, gelatin, genipin, gibberellic acid, glucono delta-lactone, glycerin, glycerol, glycerol ester of wood rosin, guaiac resin, guar gum, gum acacia, gum arabic, gum ghatti, gum guaiac, heptylparaben, peroxide derivatives, hydrogen peroxide, hydroxylated lecithin, hydroxypropyl cellulose, hydroxypropyl distarch.

Figure 5:
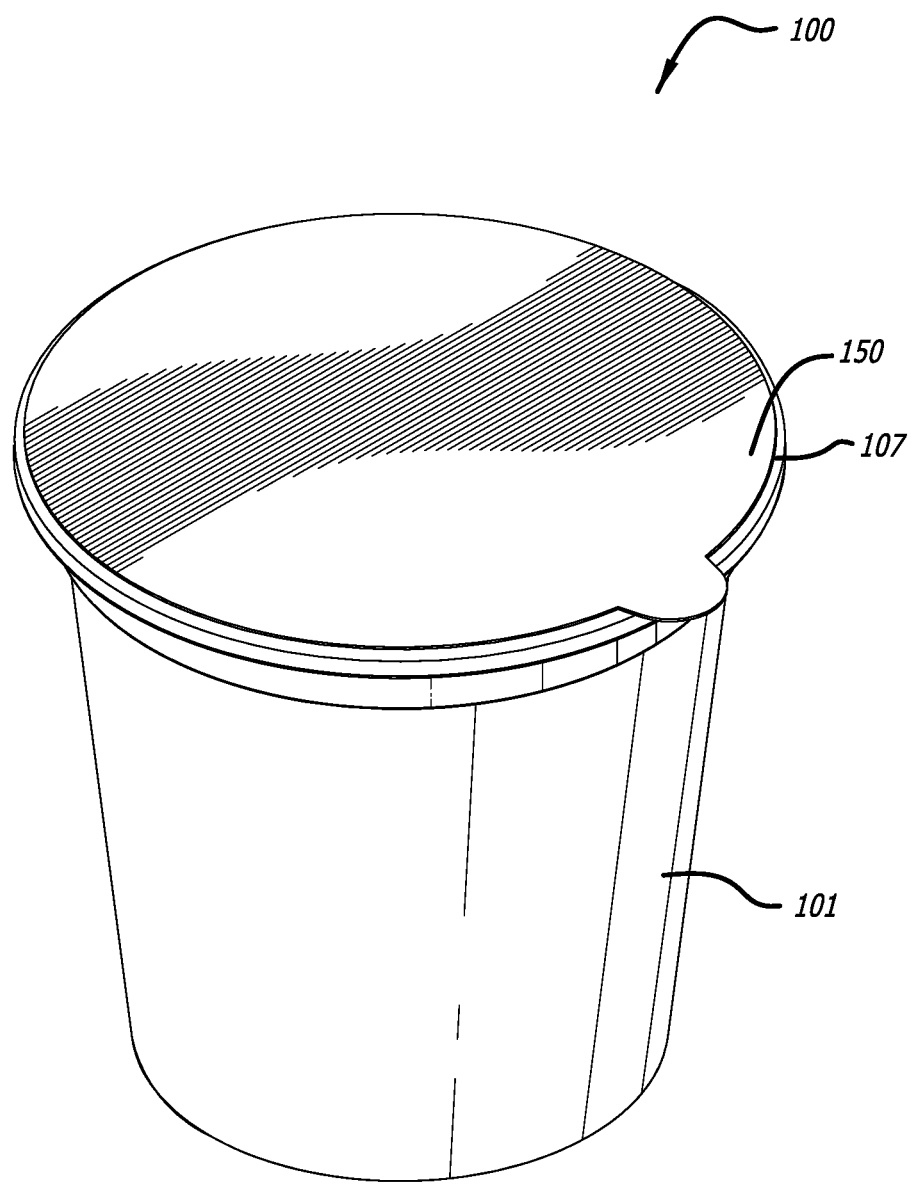
FIG. 5 is a perspective view of the container in an upright closed position with a seal.

The container 100 may be sealed, which may prevent unwanted leaking of or damage to the drink mix concentrate. The drink mix concentrate may be damaged by humidity or contamination (e.g., from dust, fluids and germs), and the seal may lock in freshness (e.g., so that the contents do not clump or become hard) and otherwise secure and protect the contents. FIG. 5 is a perspective view of the container 100 in an upright closed position with a seal 150. The seal 150 can be placed over the flaps and affixed to the outer rim 107, e.g., via glue or heat sealing, to keep the drink mix concentrate from escaping between the flaps 103, the flaps 103 clean, and moisture and other contaminants out. The seal can be paper, plastic, cellophane, and/or foil, or any other suitable material that is durable enough to provide protection and containment for the container 100. The seal 150 can also have a tab, ring, strip, or other graspable part that can facilitate removal of the seal by the consumer. A lid (not shown) can also be used to lock in freshness and protect the seal 150, or be used as a replacement for the seal 150, and can snap into place about the outer rim 107. The consumer would first need to remove the seal 150 and/or lid to use the container 100.

The container 100 can include identification information 151 to provide various information about the container and its contents, such as a unique identifier for a particular container, manufacture date, authenticity information, nutrient content and/or a blend profile/instructions. The blender can then use the identification information in a number of ways, including determining whether the container is authentic or counterfeit, and/or fresh or past an expiration date. For example, if the container 100 is expired or counterfeit, then the blender may decline to open the container 100 or actuate the blending assembly. The blender can also implement the blend profile/instructions during blending. The identification information can be read so that it can be stored locally in the blender (e.g., in non-volatile memory) and then passed to cloud storage via a communication method such as Bluetooth Low Energy (BLE) through a proxy device (e.g., a smart phone or tablet). The identification information 151 may be human readable, e.g., printed on the container 100 or printed on a label affixed to the container 100.

The identification information 151 may be unreadable by humans directly, requiring a machine for reading. For example, the identification information 151 may be stored in a near-field communication (NFC) tag, a printed memory tag, a barcode or spots of one or more colors. For example, an NFC tag can be affixed to the container 100, such that an NFC reader and antenna, e.g., in the blender, can read the identification information from the container 100 when it is used to make a smoothie.

The identification information 151 may be disposed in or the container such that it is readable via a reader or sensor in the blender. Human readable text may be a number, words and/or icons. The blender may read the identification information when the container is inserted into the blender, prior to implementing the blend cycle, during the blend cycle, and/or after the blend cycle.

Identification information can be based on machine-generated Universally Unique Identifiers ("UUIDs") (i.e., arbitrary alpha-numeric identifiers), or it can be based on well-defined encoding structures that contain one or multiple facts about the container 100. The identification information can be encrypted (e.g., using Advanced Encryption Standard ("AES")) so that decryption is required by the blender. The identification information may contain special characters or encoding structures that indicate that the container 100 is valid. The container may have a digital rights management ("DRM") marking that uses a special ink that reflects a certain wavelength of light (e.g., in response to exposure to infrared light) that can be read to determine authenticity.

The container 100 should prevent clumping or sticking of the drink mix concentrate, typically in powder form. Clumping can often occur if the drink mix concentrate is made of certain ingredients such as hydroponic freeze-dried fruit powders, but can also be exacerbated if the drink mix concentrate tends to stick to the inside of the container.

The inside of the receptacle 101 and the cover 102 should be non-stick. That is, the drink mix concentrate should not stick to the inside of the container 100, and the inside surfaces of the receptacle 101 and the cover 102 may be formed of a non-stick material or may be treated to be non-stick. By non-stick it is meant that the drink mix concentrate won't accumulate together on the respective surface when the container is disposed in any orientation, and also that the drink mix concentrate will smoothly pour out of the container 100 when normally opened to release the drink mix concentrate. Furthermore, the container 100 should not have spaces in which the drink mix concentrate could get stuck, such as inner mechanisms and crevices.

Figure 6:
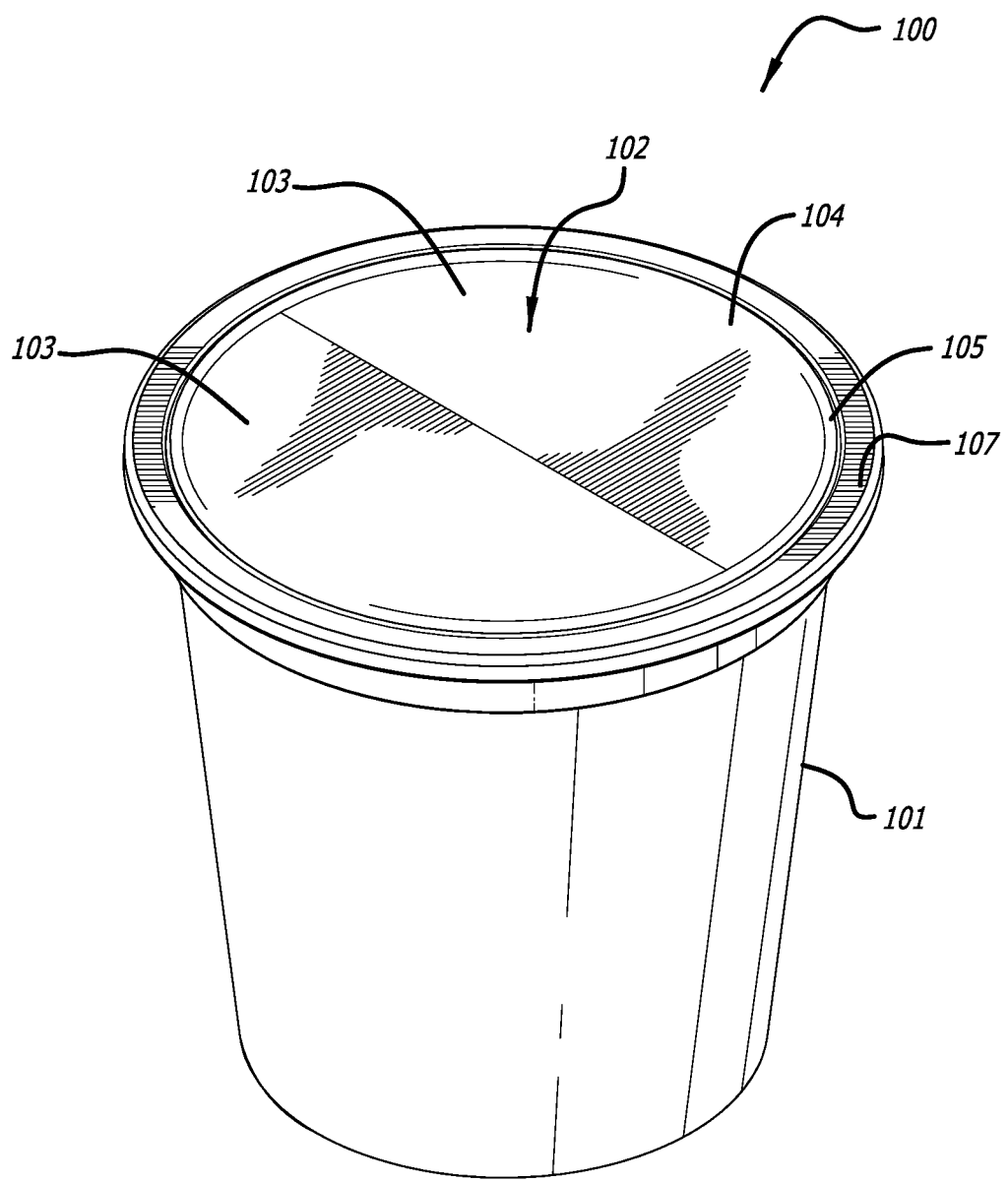
FIG. 6 is a perspective view of an alternative container having a cover with two flaps in an upright closed position.

FIG. 6 is a perspective view of an alternative container 100 with two flaps in an upright closed position. For all intents and purposes, the alternative container 100 is substantially the same as the container described above with respect to FIGS. 1-5, and thus like elements will be given like numbers.

In particular, the container 100 defines a receptacle 101 with side walls and a closed end 109 providing a lower outer surface with a lower rim at its perimeter. The lower outer surface may be flat, or, as was shown at 109a in FIG. 3, the lower rim may be essentially an extension of the receptacle's side walls. The interior space is defined by the closed end 109 and a gape, or wide open mouth, which is closed by the cover 102. The receptacle 101 can have a truncated conical shape (as shown). Other suitable shapes include cylindrical, cubical and prismatic. The receptable 101 may have ribs for structural support.

Figure 7:
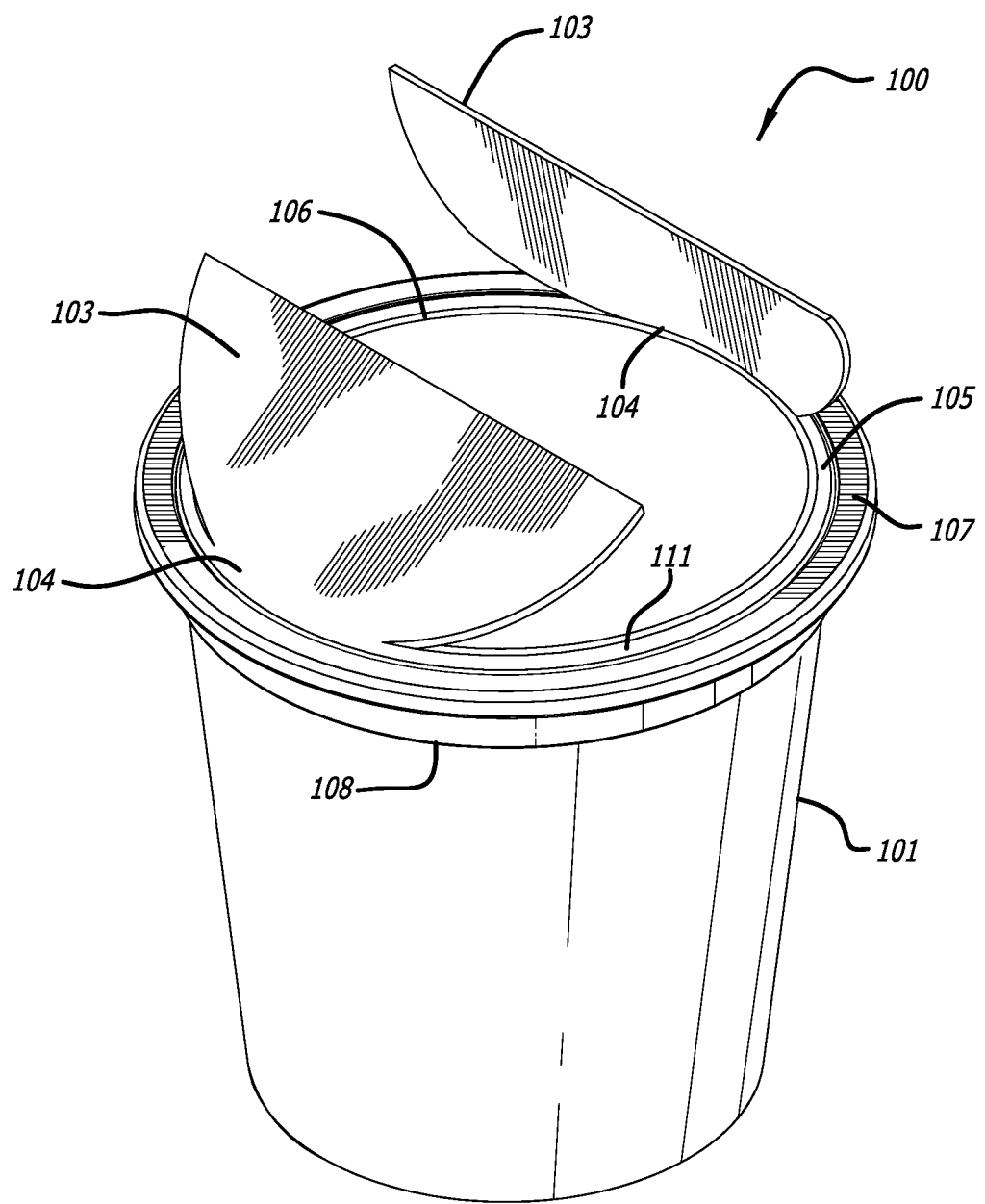
FIG. 7 is a perspective view of the alternative container of FIG. 6 in an upright open position.

FIG. 7 is a perspective view of the alternative container of FIG. 6 in an upright open position showing an inner lip 106 at a perimeter of the gape. An outer rim 107 is positioned outside and extends radially outward from the inner lip 106. The outer rim 107 is flexibly coupled to the receptacle 101 below the inner lip 106 via a lip hinge 108, such that a vertical, circular slot 111 is between the outer rim 107 and the inner lip 106 (better seen in FIG. 9). The outer rim 107 may further include an annular ledge or widening of the outer rim 107 extending radially away from the gape at an end of the outer rim 107 opposite the closed end 109.

The outer rim 107 is a portion of the outer surface and serves as a platform when the container 100 is turned upside down. The outer rim 107 may be a liplike member extending away from the receptacle 101.

Figure 8:
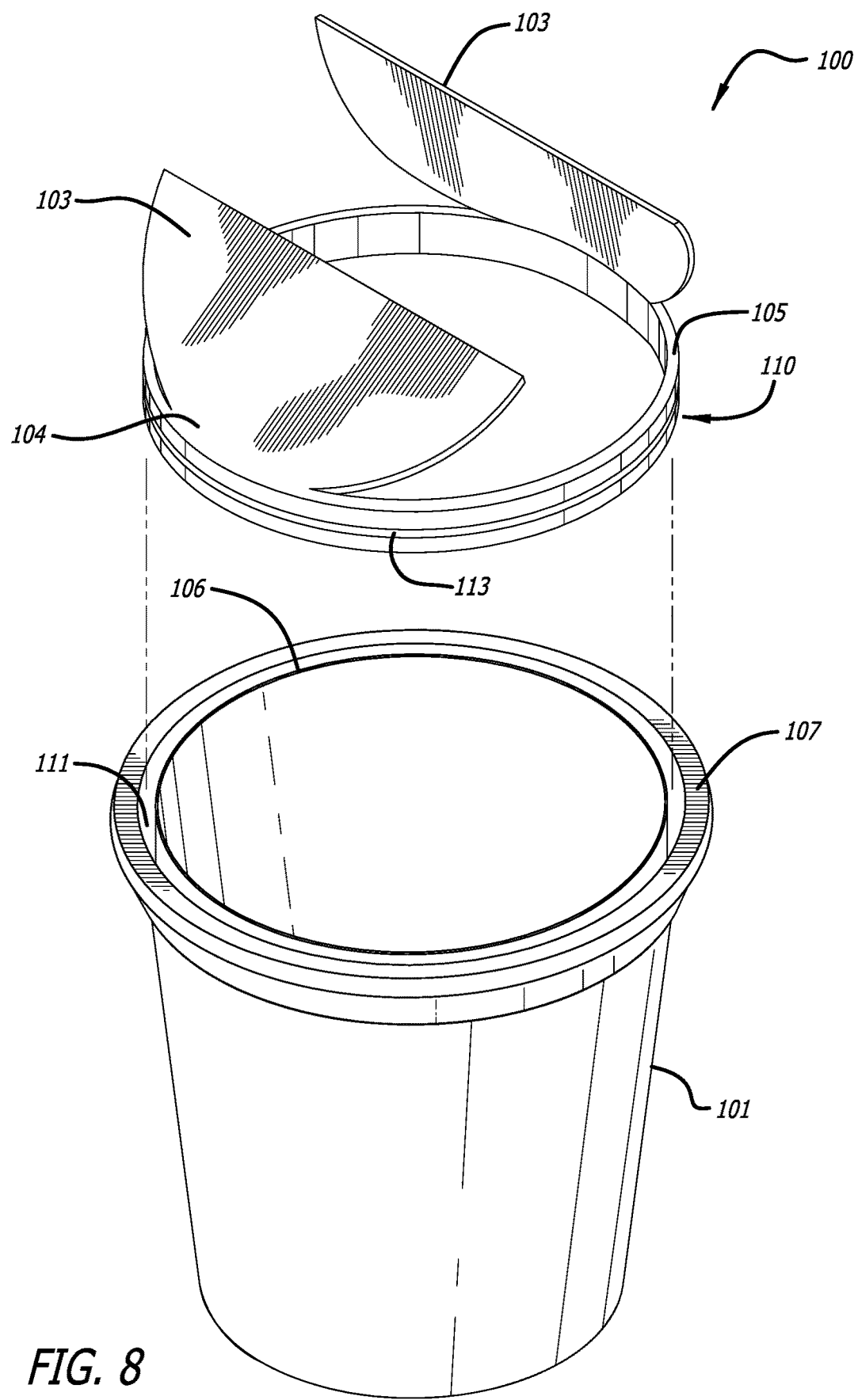
FIG. 8 is a perspective view of the alternative container of FIG. 6 with an apron ring exploded therefrom.
Figure 9:
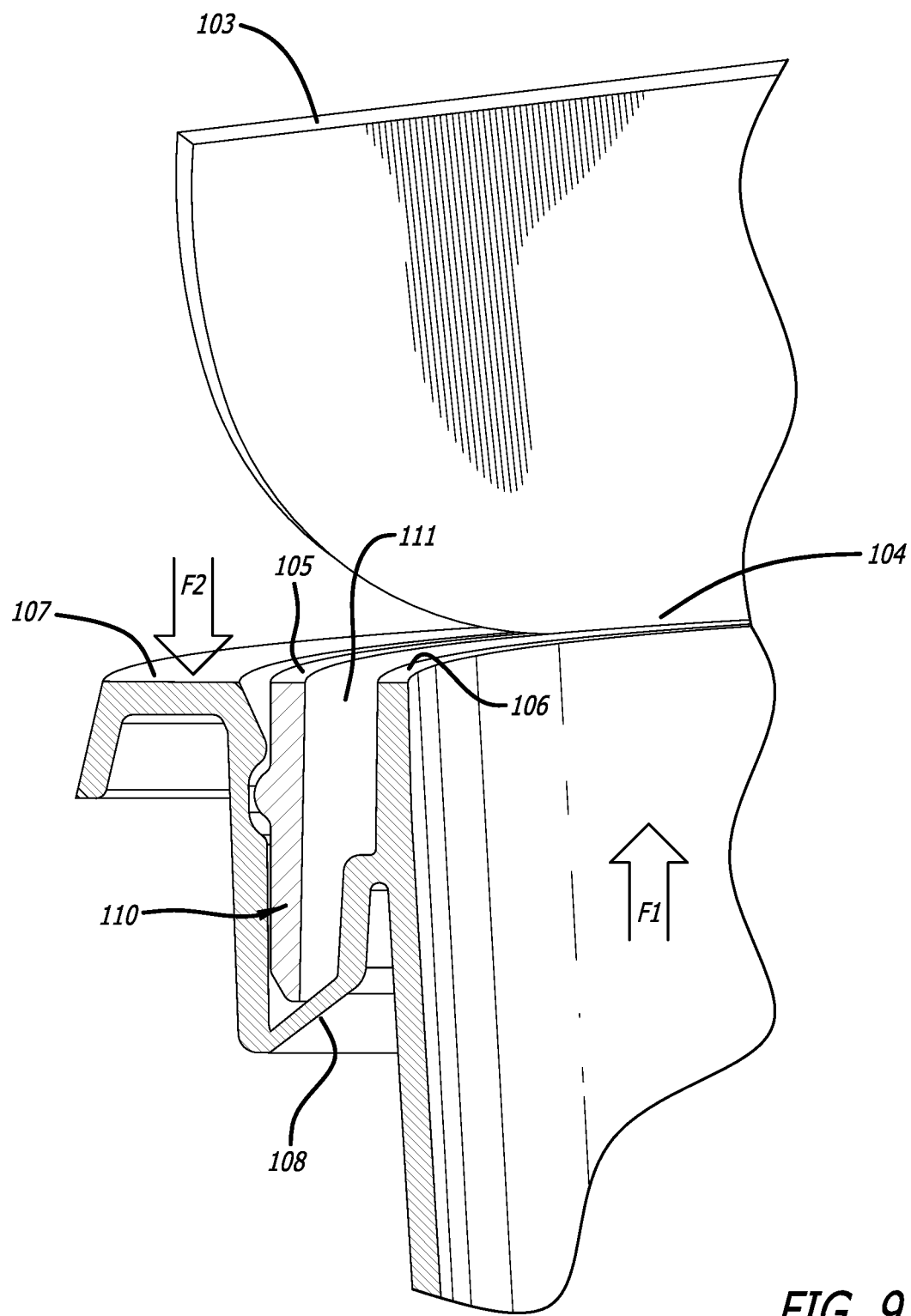
FIG. 9 is a partially sectional perspective view of the alternative container of FIG. 6 showing an opening mechanism.

FIG. 8 is a perspective view of the alternative container of FIG. 6 with the cover 102 exploded therefrom, and FIG. 9 is a partially sectional perspective view of the alternative container showing more clearly an opening mechanism.

The cover 102 includes a circular ring-shaped apron 110 connected to the two, semi-circular flaps 103. An apron rim 105 is at an edge of the apron 110 opposite the closed end 109. The apron 110 may be configured to fit in the slot 111, e.g., via a snap-fit, press-fit, or friction-fit. As seen in FIG. 3, the apron 110 may include a ridge 113 that is configured to complement a groove 114 on the outer rim 107 in the slot 111 to further fix the cover 102 to the outer rim 107. Alternatively, the apron 110 may include a groove that is configured to complement a ridge on the outer rim 107 in the slot.

The flaps 103 are broad flat projections that are each coupled to the apron rim 105 via a flap hinge 104, where the flap hinge 104 only extends along a portion of the flap 103. The flaps 103 are positioned to cover the gape, where each flap covers a portion of the gape. Two flaps 103 are shown in the alternative container 100, which is believed to be desirable in terms of opening the gape and allowing the contents of the container to empty without leaving any residual within the container.

As was described above with respect to FIG. 3, and shown in the enlargement of FIG. 9, application of a downward force F1 to the closed end 109 of the container, sets up an upward reaction force F1 on the outer rim 107 and apron rim 105 which abut the shoulder 628 in the larger vessel (FIG. 10). The container receptacle 101 terminating in the lip 106 on the other hand is free to move downward, being positioned radially inside the shoulder 628. By virtue of the flexible diaphragm or hinge 108 at the end of the slot 111, the lip 106 displaces downward (again, up in FIG. 9). This causes the lip 106 to contact both of the flaps 103 just inside the respective hinges 104, which pivots the flaps open. Given the proximity of the lip 106 to the hinges 104, a relatively small movement of the lip causes both flaps 103 to pivot completely open, roughly 90°. This maximizes the gape thus formed to permit discharge of the contents of the receptacle 101.

As mentioned above, one challenge with emptying powder ingredients from a container 100 is to release the ingredients without clumping, sticking, or getting trapped by a hinge or door. This is especially problematic for hydroponic freeze-dried fruit powders. Providing flaps 103 that pivot open has proved to be an excellent delivery method, as it opens the gape to nearly the entire area within the receptacle lip 106. Moreover, reducing the number of flaps 103 to only two is believed to provide the least impediment to the powder falling by gravity out of the receptacle 101. Of course, other solutions which maximize the gape are also contemplated, and may work adequately depending on the particular powder ingredients.

It should also be noted that although severing or puncturing a foil or other thin cover may be suitable for some powder ingredients, the uneven edges created may hinder emptying the container of all of the contents, especially where clumping is an issue. Cutting or puncturing a lid sometimes results in small particles of the lid being cut loose, which is entirely undesirable. Consequently, it is believed that providing a cover with a barrier that swings or otherwise displaces open as shown is preferred. There are of course other ways to maximize the gape without cutting or puncturing a cover, such as with an iris. The present application contemplates all techniques for opening a container without cutting or puncturing a cover, in particular by providing an opening mechanism that is self-contained in the pod or receptacle, and simply requires external actuating forces be applied, such as when screwing on a lid of a larger vessel. More specifically, a container or pod with flaps that open when the container is squeezed simplifies the operation while maximizing the probability that all of the contents are emptied and no unwanted particles such as when cutting a lid are produced.

Referring now to FIG. 10, there is shown a cross-sectional exploded view of a blender 600 and the container 100. The blender 600 includes a bottle 620 and a lid 630. The bottle has an exterior 621, a blending chamber 622, an outer wall

623, a blending assembly 624 with at least one blade 625 driven by a motor 626, a shoulder 628 and a bottle component 629 of a coupling mechanism. The lid 630 has a container receiver 631, a lid component 632 of the coupling mechanism about the container receiver 632, a discharger 633, and electronic devices 634.

The blender 600 can also include a button 635 for controlling its operation. Though the button 635 is shown at the top of the lid 630, one or more buttons can be located in locations that are accessible to a consumer, such as the bottom of the bottle 620 or the sides of either the bottle 620 or the lid 630. The button 635 can also be positioned inside the bottle 620 or lid 630 such that it is actuated by closing of the lid. In one example, the button 635 can be actuated by mechanical depression of the button 635 (e.g., when the lid is rotated), which may or may not require the container 100 to be positioned in the blender 600. In other examples, the blender 600 does not have a button, and the blender 600 is actuated electromechanically via a reed switch or hall sensor.

In the alternative, element 635 at the top center of the lid 630 may be a large LED indicator. As described below, the LED indicator 635 may have different colors for blender status or unsafe conditions, for example.

The exterior 621 of the bottle 620 and lid 630 can be formed of one or more of any suitable material that is durable and rigid, such as plastic, rubber, metal, a coated material, wood, foam, etc. The bottle 620 and the lid 630 can be formed of the same material or different materials.

The blending chamber 622 is in the interior of the bottle 620. The blending chamber 622 is suitable for containing a fluid without leaking. The blending chamber 622 is durable and rigid, and may be formed of metal, plastic, a coated material, glass, etc. The blending chamber includes the shoulder 628 to engage the container 100. An opening allows for fluids and nutrient content to be placed in the blending chamber 622, and for the consumer to remove blended smoothie from the blending chamber 622.

The blender 600 includes the bottle component 629 and lid component 632 of the coupling mechanism. The bottle component 629 and the lid component 632 together removably couple the bottle 620 and the lid 630. For example, the components 629 and 632 can be complementary threads, a bayonet coupling, complementary slots and posts, or other suitable type of coupling such that the lid 630 can be removably attached to the bottle 620. For the complementary threads, the threads can be on an exterior surface of the lid 630 and an interior surface of the bottle 620, or the threads can be on an interior surface of the lid 630 and an exterior surface of the bottle 620.

The lid 630 includes a container receiver 631 configured to have a complementary shape to the container 100. The lid 630 optionally may further include a discharger 633 that causes the container 100 to open and its contents to be discharged when the lid 630 is coupled to the bottle 620. In one example, as a result of the lid 630 being coupled to the bottle 620, the discharger 633 presses the container 100 towards the bottle 620 to discharge the contents from the container 100. The discharger 633 can cause the contents to be discharged from the container 100, including via a spring mechanism and/or a screw mechanism. For example, coupling of the lid 630 to the bottle 620 can deploy a spring mechanism in the discharger 633 to press against the closed end 109 of the container 100. In another example, coupling of the lid 630 to the bottle 620 can turn a screw mechanism in the discharger 633 that causes the discharger 633 to press against the closed end 109 of the container 100. In yet another example, the discharger 633 may merely provide a firm fixed surface to apply pressure to the closed end 109 of the container 100.

To ensure that containers are quality-controlled, not reused or refilled, unique identifiers in the identification information can be read and stored locally on the blender 600. When identification information for a particular container is read, the unique identifier is checked against this list and the blender may not operate if the unique identifier is on the list. Electronic devices for reading identification information from a container loaded in the blender may be located in the bottle 620 and/or the lid 630.

The blender 600 can have indicators, including indicator lights and/or sounds, to notify a consumer about the state of the blender 600. For example, different sounds, light colors, or light modulation can indicate different states, such as whether the container 100 is expired or counterfeit, whether the battery level is low or fully charged, whether there is problem with the alignment of the lid 630, whether the blending assembly is stuck, etc. In one example, an indicator light can emit a certain color to indicate a certain state, such as red for a stuck blending assembly, yellow to indicate a low battery, or green to indicate a fully charged battery. In another example, the blender can emit a certain sound to indicate a certain state, such as persistent beeping to indicate a stuck blending assembly or intermittent beeping to indicate a low battery.

The blender 600 may have firmware for tracking and communicating exceptions and unsafe conditions so that the consumer can be notified and/or appropriate responses can be made. The firmware can control indicators for exceptions and unsafe conditions. Indicators for exceptions and unsafe conditions may use a combination of LED color, intensity and pulsing. Exception and unsafe conditions may also be indicated via sounds. In another example, the blender 600 can transmit exceptions and unsafe conditions via a transceiver to a computer, table, or smart phone to alert the consumer. An exception is something that is not normal but is also not unsafe. For example, "liquid level too low", "counterfeit pod", or "lid not closed" are exceptions. An unsafe condition could cause irreparable harm to the unit, or bodily harm to the consumer. Examples of unsafe conditions include "motor jammed" and "battery overheating". The blender 600 can continuously monitor for exceptions and/or unsafe conditions. In the event of an unsafe condition, the blender will go into "failsafe mode". If a consumer feels that the blender is not functioning properly, the consumer can manually turn it off and "reboot" it using a "panic mode". Both "failsafe mode" and "panic mode" can put the device into "recovery mode".

The blender 600 is configured to have a blending chamber 622 with a capacity to make a smoothie having a desirable volume for human consumption. For example, the blending chamber 622 can have a capacity of six fluid ounces to thirty-two fluid ounces. In one example, the blending chamber 622 has a capacity of about ten fluid ounces. The container 100 is configured to have a size with a capacity for nutrients that is complementary to the fluid capacity of the blender, such that a smoothie with a desirable consistency and flavor can be blended. For example, the container 100 can have a capacity from one fluid ounce to eight fluid ounces. In one example where the blender has a capacity of ten fluid ounces, the container 100 may have a capacity of 2 fluid ounces.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus for making a delightful beverage from a drink mix concentrate and a fluid within a vessel, the apparatus comprising:
   a closed container defining a cup-shaped receptacle with an interior space and having a top end with a cover over an open mouth opposite a closed bottom end along a vertical axis, wherein the mouth has a size perpendicular to the vertical axis at least as wide as the bottom end perpendicular to the vertical axis;
   a drink mix concentrate disposed in the interior space, wherein the drink mix concentrate is pourable;
   wherein the closed container restricts the drink mix concentrate to the interior space of the receptacle until a first force and a second force are applied to separate areas of the container;
   wherein when the closed container is placed within a compartment of a larger vessel, the cover is adapted to form an opening to an interior of the larger vessel from application of both the first force applied to the top end and the second force applied to the bottom end without cutting or puncturing the cover;
   wherein the first force and the second force are equal in magnitude and between 25 N and 75 N; and
   wherein the opening allows the drink mix concentrate to pour therethrough into the interior of the larger vessel under force of gravity, wherein:
   the container includes a side wall extending between the first outer surface and the second outer surface;
   the top end includes a first rim;
   the first force is applied only to the first rim; and
   the bottom end includes a second rim;
   the second force is applied only to the second rim; and
   application of the first force to the first rim and the second force to the second rim causes the container to deform.

2. The apparatus of claim 1 wherein the first rim is circular.

3. The apparatus of claim 1 wherein the first force is applied evenly to the first rim.

4. The apparatus of claim 1 wherein the second rim is circular.

5. The apparatus of claim 1 wherein the second force is applied evenly to the second rim.

6. The apparatus of claim 1 wherein the cover is adapted to form the opening from simultaneous application of the first force and the second force.

7. The apparatus of claim 1 wherein the cover comprises at least one hinged flap that forms the opening when in an open configuration.

8. The apparatus of claim 1 wherein the cover comprises at least one mated pair of hinged flaps that form the opening when in an open configuration.

9. The apparatus of claim 1 wherein the opening consists of a single gap formed in the cover.

10. The apparatus of claim 1 wherein the drink mix concentrate in the container is a single serving size.

11. The apparatus of claim 1 further comprising a seal comprising a sheet of flexible material covering the top end.

12. The apparatus of claim 1 wherein the size of the mouth is at least 25 mm and less than 65 mm, and the bottom end has a width of at least 25 mm and less than 45 mm.

13. An apparatus for making a delightful beverage from a drink mix concentrate and a fluid within a vessel, the apparatus comprising:
   a closed container defining a cup-shaped receptacle with an interior space and having a top end with a cover over an open mouth opposite a closed bottom end along a vertical axis;
   a drink mix concentrate disposed in the interior space, wherein the drink mix concentrate is pourable;
   wherein the container restricts the drink mix concentrate to the interior space of the cup-like receptacle;
   wherein when the container is placed within a compartment of a larger vessel, the cover is adapted to form an opening to an interior of the larger vessel from application of a first force applied to the top end and a second force applied to the bottom end without cutting or puncturing the cover; and
   wherein the opening allows the drink mix concentrate to pour therethrough into the interior of the larger vessel under force of gravity, wherein:
   the container includes a side wall extending between the top end and the bottom end,
   the top end includes a first rim;
   the first force is applied only to the first rim; and
   the bottom end includes a second rim;
   the second force is applied only to the second rim; and
   application of the first ramie of force to the first rim and the second range of force to the second rim causes the container to deform.

14. The apparatus of claim 13 wherein the first rim is circular, and the first force is applied evenly to the first rim.

15. The apparatus of claim 14 wherein the second rim is circular, and the second force is applied evenly to the second rim.

16. The apparatus of claim 13 wherein the cover comprises at least one hinged flap that forms the opening when in an open configuration.

17. The apparatus of claim 13 wherein the cover comprises a mated pair of hinged flaps that form the opening when in an open configuration.

18. The apparatus of claim 13 wherein the opening consists of a single gap formed in the cover.

19. The apparatus of claim 13 wherein the drink mix concentrate in the container is a single serving size.

20. The apparatus of claim 13 further comprising a seal comprising a sheet of flexible material covering the cover.

\* \* \* \* \*